Nov. 29, 1927.  
J. R. WINTER  
1,651,111  
FORMING METAL  
Filed May 14, 1924  
2 Sheets-Sheet 1

Inventor:
John R. Winter,

Nov. 29, 1927.

J. R. WINTER

FORMING METAL

Filed May 14, 1924    2 Sheets-Sheet 2

Inventor.
John R. Winter,

Patented Nov. 29, 1927.

1,651,111

UNITED STATES PATENT OFFICE.

JOHN R. WINTER, OF WARREN, OHIO, ASSIGNOR TO YOUNGSTOWN PRESSED STEEL COMPANY, OF WARREN, OHIO, A CORPORATION OF OHIO.

FORMING METAL.

Application filed May 14, 1924. Serial No. 713,218.

Figure 1:
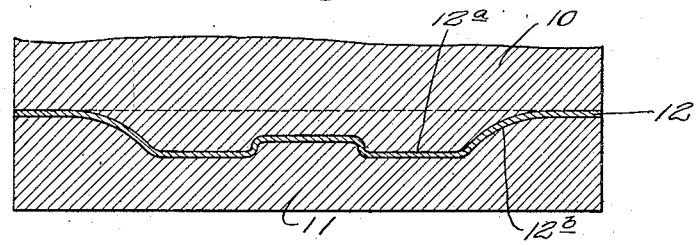
Figure 2:
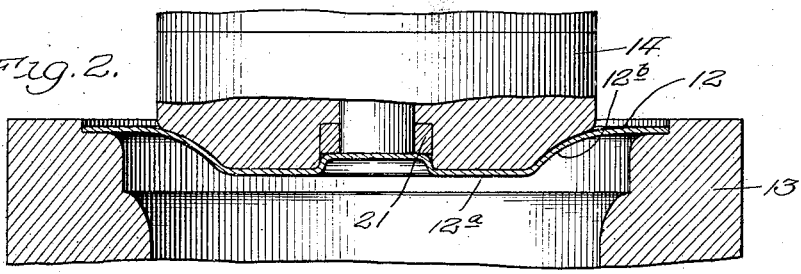
Figure 3:
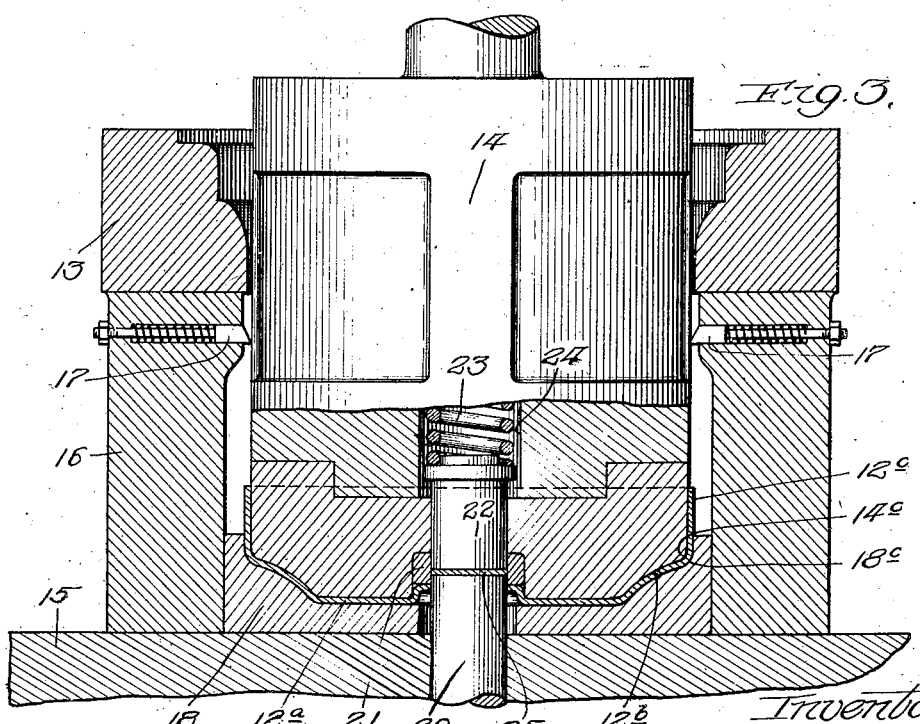

The present invention relates to improvements in the art of cold pressing brake drums and like articles and will be fully understood from the following drawings, in which:

Figures 1, 2 and 3, illustrate successive stages in the formation of a brake drum or like article from a flat blank; and Figs. 4, 5, 6 and 7, illustrate successive stages in the formation of a drum of a different contour.

In the manufacture of brake drums and like articles by cold pressing methods hitherto in use, great difficulty has been encountered in securing close limits of tolerance in concentricity of the internal and external drum cylinders, as well as a true rectangularity between the cylindrical portion of the drum and its base. The limits of tolerance which could be secured by the methods hitherto known ran from .020 inch upwards in "out of round" variation for the braking surfaces. Brake drums which did not exceed these limits of tolerance can be satisfactorily employed in two-wheel brake systems, but such drums give rise to difficulties in adjustment in four-wheel brake systems. The latter type of systems require braking surfaces with an "out of round" variation not exceeding .015 inch. In order to secure surfaces within this limit of tolerance on cold pressed brake drums, as hitherto made, it has been necessary to machine parts of the braking surfaces, thereby producing variations in surface structure which give rise to uneven wear of the braking surfaces and to an ultimate "weaving" and distortion of the cylindrical portions of the drums.

In accordance with the present invention, brake drums are produced by cold pressing methods in which the braking surfaces are held within much closer limits of tolerance as to concentricity than by methods hitherto known, and the angular relation and "squareness" of the sides of the drum with respect to its base is closely maintained.

Figs. 1 to 3 inclusive, illustrate successive steps of the process of the present invention as applied, for instance, to a brake drum having a profiled base, as used, for example, with metal wheels and as distinguished from those having substantially flat bases, as used, for example, with wood wheels. Referring more particularly to the drawings, in Fig. 1 numerals 10 and 11 illustrate, in section, parts of a preforming die and pad respectively by means of which a flat blank is preliminarily formed as shown at 12 in cross section. By the preforming dies 10 and 11 the central portion $12^a$ of the base is given the conformation desired in the base of the drum as finally formed, and around it an annular area $12^b$ is given a curved conformation which provides a limiting area of shaped metal which prevents deformation of the base in subsequent drawing operations.

After the blank 12 has been preformed as shown in Fig. 1, it is placed on the upper surface of a drawing die 13, as shown in Fig. 2, to be operated upon by the reciprocating die 14 of the press. In Fig. 2 the die 14 is shown as it engages with the upper surface of the blank 12.

As shown in Fig. 3, the drawing die 13 is supported some distance above the bed 15 of the press upon a suitable annular support 16 provided with stripping plungers 17. Below the center opening of the die 13 is provided the pad 18, into which the shaped drum is forced by the die plunger 14 at the end of its stroke, after having passed through the drawing die 13. In passing through the drawing die 13, the drawing surface $13^a$ thereof brings the outer portion of the blank 12 into cylindrical shape, as shown at $12^c$ in Fig. 3. The curved annular portion $12^b$ of the blank provides a curved limiting area of metal which prevents the base portion $12^a$ from becoming distorted during the drawing of the cylindrical side portion $12^c$. After passing through the drawing die 13 the plunger 14 carries the drawn blank down into the pad 18, which is so shaped, in the form shown, as to provide slightly less clearance between the pad and the plunger at the limit of the stroke of the latter at the base of the cylindrical side $12^c$, these points being indicated in the drawing by the numerals $14^c$ and $18^c$ respectively. As a result of this conformation of the plunger and the pad, there is a slight swaging action at this point, the additional clearance in the adjacent portion of the bottom of the pad permitting the necessary slight flow of metal.

By carrying out the operation as hereinbefore described, the curved portion $12^b$ of the preformed blank 12 provides a limiting area of shaped metal preventing distortion of the base and consequently producing the proper conformation of the cylindrical sides of the resulting drum. The swaging action at the base of the sides of the drum aids to some extent in setting the side portions of the drum in their proper relation to the base.

In many cases it is desired to form a central opening in the drum (for example, for the hub of the wheel), and it is important that this opening be centered exactly with respect to the concentric inner and outer braking surfaces of the drum. For that purpose, in carrying out the invention as shown in Figs. 1, 2 and 3, means are provided for forming such opening in the center of the base of the drum during the last stage of the described procedure while the drum is in the pad 18. As shown in Fig. 3, a rigid punch member 20, of suitably hardened steel, secured in the bed 15 of the press, passes through the pad 18, projecting slightly above its inner surface and being centered exactly with respect to the portions of the pad engaging the side walls of the drum when the latter is in position in the pad. A hardened metal ring 21 is inserted in the plunger or die 14 to co-operate with the cylindrical punch 20. In a suitable cylindrical opening is mounted the ejecting plunger 22, which is normally forced outward by a spring 23 in the enlarged opening 24 in the reciprocating die 14. As the die 14 forces the drum into the pad 18, the cutter members 20 and 21 punch out a central slug of metal, indicated by the numeral 25, and on the rising stroke of the plunger, this is ejected by the ejecting plunger 22.

Figure 4:
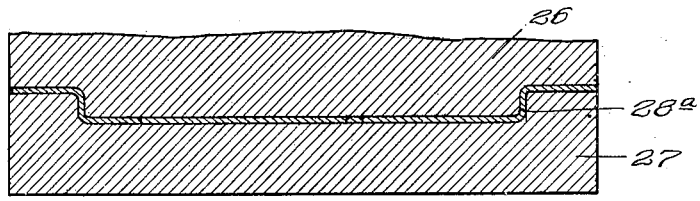
Figure 5:
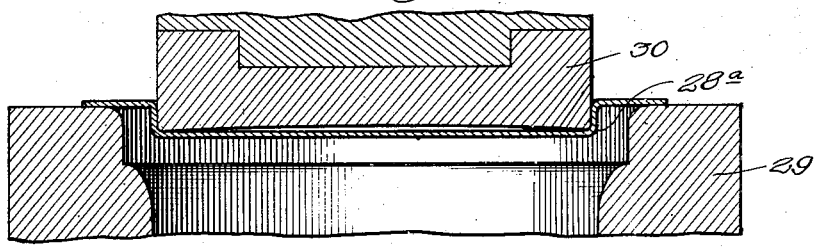
Figure 6:
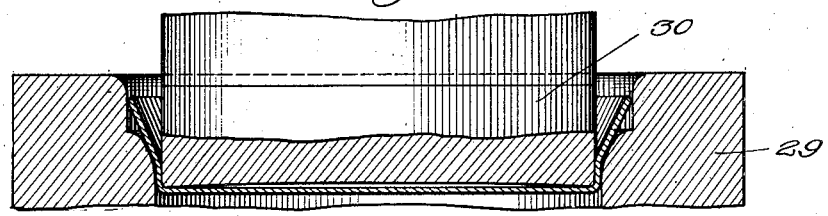
Figure 7:
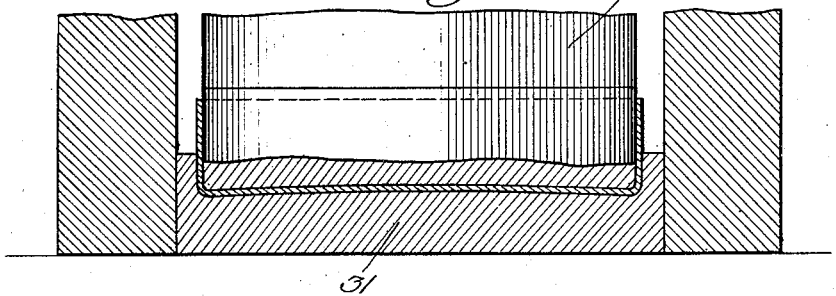

In Figs. 4 to 7 are shown the successive steps in the formation of a brake drum of the usual type, having a substantially flat or slightly dished bottom. In carrying out the process for the production of such a drum, a circular blank is preliminarily formed by dies 26 and 27 as shown in Fig. 4, a portion of the metal surrounding the central portion which forms the base of the drum as finally produced being turned upward, as shown at 28ª in Fig. 4. This upcurved portion of the metal serves in subsequent operations to prevent distortion of the central or base portion of the blank and likewise substantially prevents any distorting flow of metal to or away from the base portion thereof. The blank 28, preformed as shown in Fig. 4, is then placed upon the drawing die 29, and is forced therethrough by the reciprocating die 30. As it passes through the die 29, the drawing surfaces of the latter cause the marginal portions of the blank 28 outside of the curved portion 28ª to assume their proper cylindrical form without substantial distortion of the base or central portion of the blank. The blank, after being forced by the reciprocating die 30 through the drawing die, is finally forced into the pad 31, by which the shape of the drum is set and, in the form shown, the base thereof given a slightly dished formation.

By virtue of the two step form of the female die 13 or 29 the final drawing is in the embodiment illustrated, produced in two steps by a single stroke of the male die. In the first step the blank is supported adjacent its edge while the male die and blank are relatively located by contact throughout the depressed central portion of the blank produced by the preliminary pressing. The margin of the blank is thus first brought to the frustoconical form illustrated in Fig. 6. The second step of the female die then contacts the blank in a zone adjacent the central depressed portion and by wiping action traveling toward the margin the margin is brought to a cylindrical form with a minimum of distortion of the central portion.

By carrying out the operations of pressing drums and like objects by the method of the present invention, it has been found possible to reduce the "out of round" variations to less than .015 inches, the greater proportion of the drums formed showing a variation of less than .010 inch. The resulting drums are found to retain their true shape, and not to distort or weave on standing. Furthermore, by reason of the fact that machining their surfaces is not necessary, a true and uniform braking surface is provided of such accuracy in construction as to make it immediately available for use where fine adjustment of the surfaces is required, as in four-wheel brake systems. It is readily apparent that the process of this invention may be employed for pressing other articles than brake drums, particularly where accuracy in conformation is desired.

I claim:

1. The method of accurately cold pressing brake drums and the like from substantially flat blanks which comprises preforming around at least a portion of the metal forming the base of the finished article a shaped area the radii of which are out of rectilinear alignment with the radii of the base of metal, and subsequently pressing to shape the metal of the blank surrounding said shaped area of metal, thereby confining and preventing distortion of the base.

2. The method of accurately cold-pressing brake drums and the like from substantially flat blanks which comprises forming around at least a portion of the metal forming the base of the finished article a shaped area of metal, the radii of which are out of rectilinear alignment with the radii of the base, drawing the metal surrounding the shaped area to a position substantially at right angles to its original position, and pressing the drawn article in a pad substantially conforming in shape thereto.

3. The method of accurately cold-pressing brake drums and the like from substantially flat blanks which comprises preforming around at least a portion of the metal forming the base of the finished article a shaped area of metal, the radii of which are out of rectilinear alignment with the radii of the base, drawing the metal surrounding the shaped area to a position substantially at right angles to its original position, pressing the drawing article in a pad substantially conforming in shape thereto, and swaging the metal at the angle at the base of the drawn area of metal.

4. The method of accurately cold-pressing brake drums and the like from substantially flat blanks which comprises preforming at least a portion of the base of the drum to a form acting to center the subsequent operation, drawing the side walls of the drum, pressing the drawn article in a pad of substantially conforming shape and simultaneously perforating its base, thereby accurately determining its proportions and the relative position of the perforation.

5. The method of accurately cold pressing brake drums or the like which comprises forming a substantially flat disk, depressing the central portion of the disk into a plane parallel with and spaced from the plane of the margin thereof, drawing said margin to cylindrical form accurately rectangular to said central portion by means of a male die, accurately locating said blank upon the male die by contact thereof with said central portion.

6. The method of accurately cold pressing brake drums or the like which comprises depressing the center of a substantially flat circular blank into a plane parallel with and spaced from the margin thereof, centering the blank upon a male die by contact thereof with said depressed portion, by a single stroke of said die subjecting said blank to a two step drawing operation, the first step applied adjacent the edge of the blank to bring the margin to a frusto conical form, the second step initiated adjacent said depressed portion and proceeding to the margin to bring the margin to a cylindrical form accurately rectangular with respect to the central portion.

JOHN R. WINTER.